Sept. 1, 1959  G. A. LYON  2,902,317
WHEEL COVER
Filed Sept. 3, 1954  2 Sheets-Sheet 1
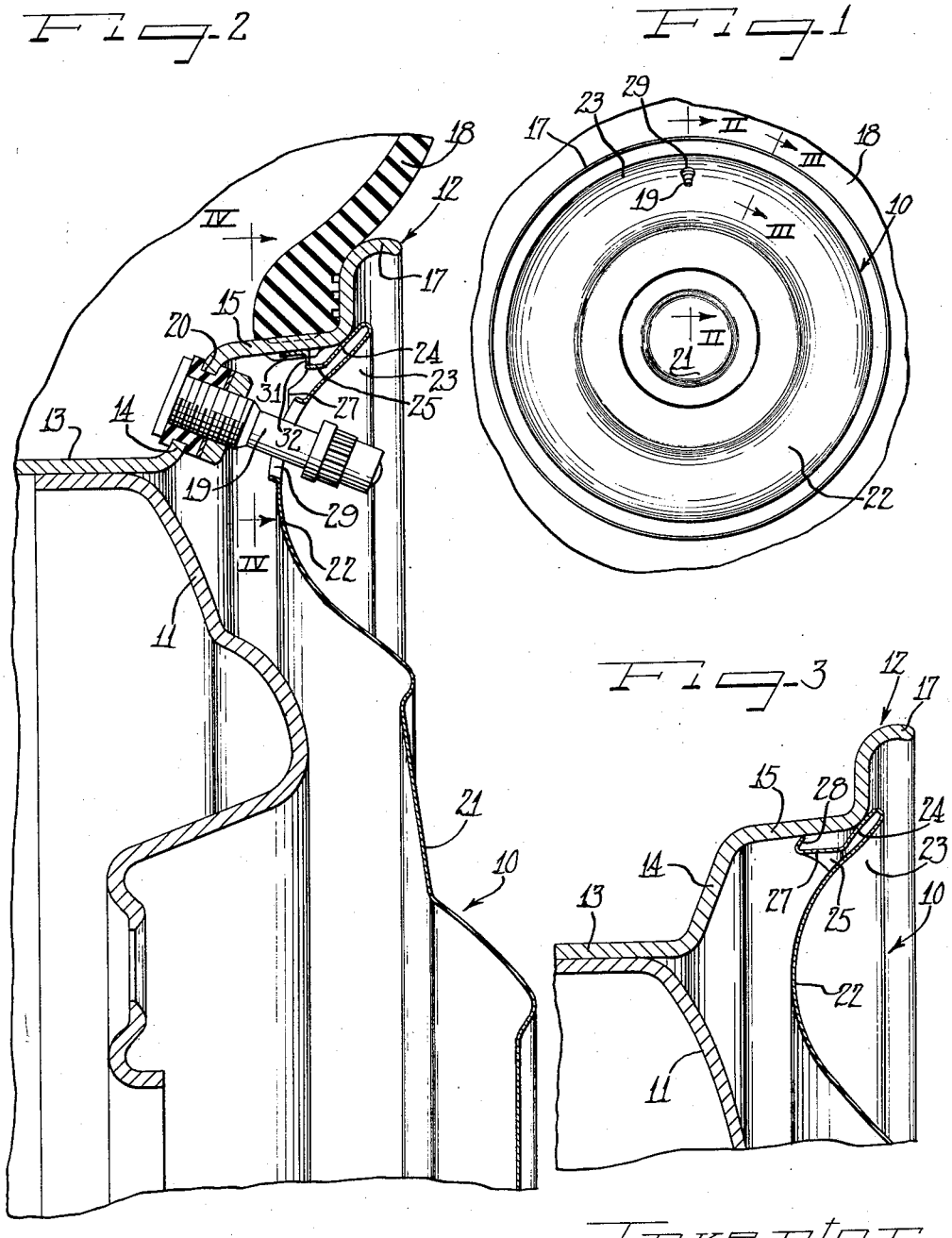
Inventor
George Albert Lyon
by Hill, Sherman, Meroni, Gross & Simpson Attys

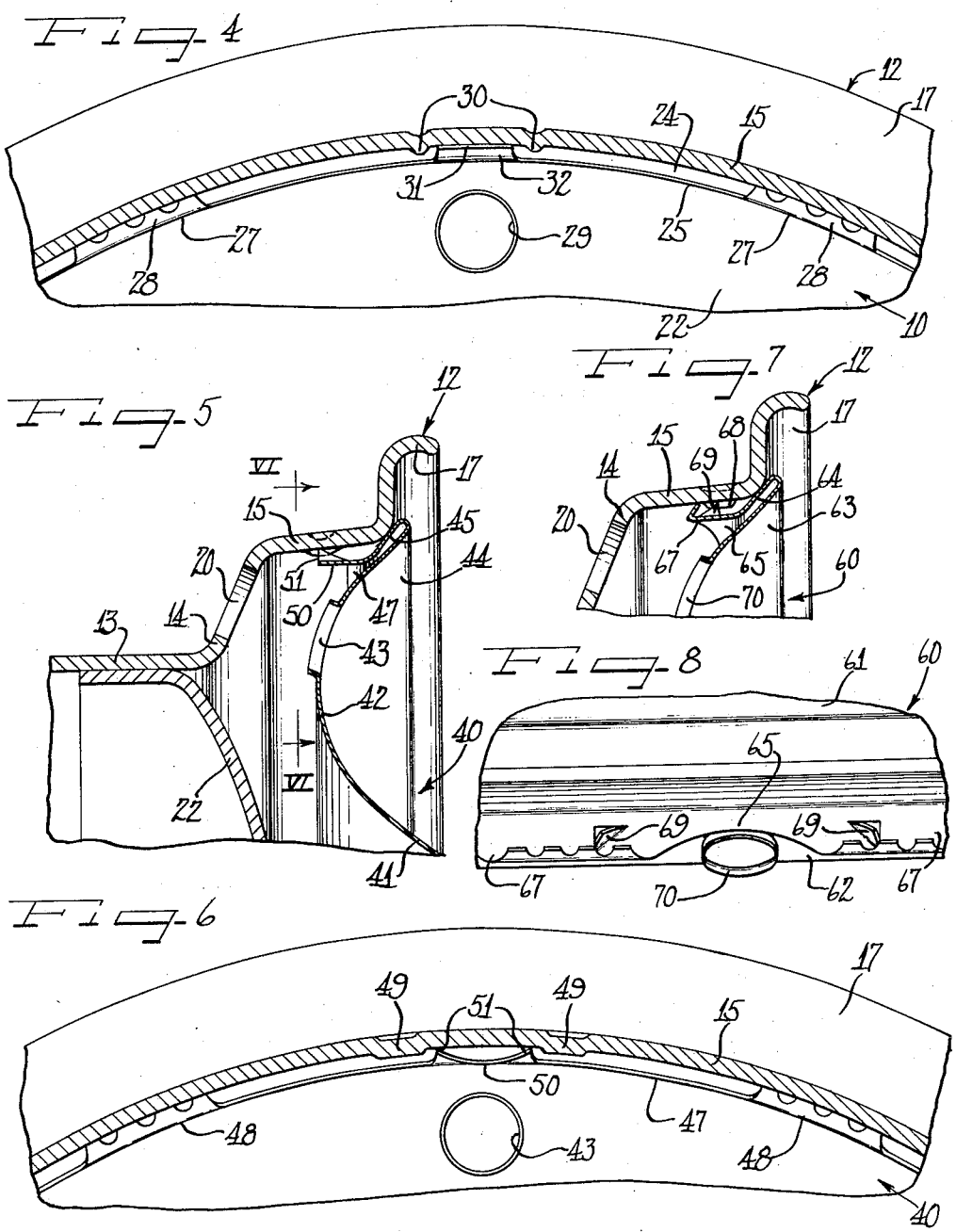

United States Patent Office
2,902,317
Patented Sept. 1, 1959

2,902,317

WHEEL COVER

George Albert Lyon, Detroit, Mich.

Application September 3, 1954, Serial No. 454,145

10 Claims. (Cl. 301—37)

The present invention relates to improvements in wheel structures and more particularly concerns the ornamental and protective covering of outer sides of vehicle wheels.

In service heavy torque strains are often imposed upon the vehicle wheels. As a result there is a tendency at times for wheel covers of the full disc type to turn slightly relative to the wheel, so that a valve stem projecting therethrough may be distorted and under severe relative turning of the cover may even be sheared. These conditions are, of course, encountered primarily where heavier types of covers are demanded, and in connection with covers used on the more powerful vehicles adapted to be operated at high speeds and with fast starts and stops.

A desirable expedient for preventing such relative turning of the covers on the wheels has been to provide projections of substantial size on the tire rims for engagement by a portion of the cover. Such projections have been made by pressing or embossing the same from the material of the rims. This has been an excellent expedient where pneumatic tire and tube assemblies have been used on the wheels. However, with the advent of tubeless tires, where the tire rim cooperates directly with the tire to maintain an inflated condition of the tire, extreme care to avoid any possible fracture or crack in the tire rim has been requisite in order to prevent any possibility of leakage through the rim. This has seriously curtailed the use of bumps or projections for turn prevention because of the danger of fracturing the metal of the tire rim in the pressing of the bumps.

An important object of the present invention is to provide an improved wheel structure in which a novel cooperative construction is afforded between a wheel cover and the tire rim for preventing turning of the cover on the wheel and enabling safe use of the tire rim in conjunction with a tubeless pneumatic tire.

Another object of the invention is to provide a novel embossed turn preventing bump structure for tire rims for use with tubeless pneumatic tires.

A further object of the invention is to provide an improved wheel cover of self-retaining type having turn-preventing means cooperable with extremely shallow turn-preventing bumps on a tire rim.

Other objects, features and advantages of the present invention will be readily apparent from the following detailed description of certain preferred embodiments thereof taken in conjunction with the accompanying drawings, in which:

Figure 1 is a side elevational view of a wheel structure embodying features of the invention;

Figure 2 is an enlarged fragmentary radial sectional view taken substantially on the line 2—2 of Figure 1;

Figure 3 is a fragmentary enlarged radial sectional view taken substantially along the line 3—3 of Figure 1;

Figure 4 is a rear fragmentary sectional elevational view taken substantially along the line 4—4 of Figure 2.

Figure 5 is a fragmentary radial sectional view similar to Figure 2 but showing a modification.

Figure 6 is a fragmentary rear sectional and elevational view taken substantially on the line 6—6 of Figure 5.

Figure 7 is a fragmentary radial sectional view similar to Figure 5 but showing a further modification; and Figure 8 is a fragmentary edge elevational view of the cover of Figure 7.

Having reference to Figures 1–4, a cover 10 which is preferably of the full disk type is provided for substantially covering a vehicle wheel comprising a wheel body 11 and a tire rim 12 provided with a base flange 13 secured to the perimeter of the wheel body and merging with a generally radially outwardly and axially sloping side flange 14 leading into an intermediate generally axially outwardly and radially outwardly sloping flange 15 from which extends a terminal flange 17. The tire rim 12 is adapted to support a tubeless pneumatic tire 18. A valve stem 19 is suitably secured within a valve stem opening 20 in the side flange 14 and projects generally axially outwardly and radially inwardly from the tire rim side flange.

In the present instance the wheel cover 10 is made from a single sheet of suitable sheet material such as stainless steel, brass or the like drawn to shape and appropriately finished on its outer face as by polishing and plating or other suitable finish. A central crown portion 21 of the cover is arranged to overlie the wheel body 11 and merges with a dished annular intermediate portion 22 arranged to overlie the juncture of the wheel body with the tire rim and the side flange 14 of the tire rim. An outer marginal generally radially and axially outwardly directed portion 23 of the cover is arranged to overlie the intermediate flange 15 and a portion of the terminal flange 17 and has an underturned marginal flange 24 adapted in assembly with the wheel to lie against the shoulder at juncture of the intermediate and terminal flanges of the tire rim. From the underturned flange 24 extends a short generally radially and axially inwardly projecting annular terminal flange portion 25 arranged to lie in spaced relation to the intermediate flange 15. From the flange portion 25 extends a series of 8 to 16 as may be preferred, resilient generally axially inwardly extending retaining extensions 27 having short and stiff generally radially and axially outwardly oblique retaining terminals 28 engageable under resilient tensioned thrusting retaining engagement with the intermediate flange 15, as covered in my Patent 2,624,634 issued January 6, 1953.

Means are provided on the tire rim and on the cover to cooperate in retaining the cover against turning relative to the wheel in service and thus prevent distortion of the valve stem 19 which in the assembly projects through a suitable valve stem aperture 29 formed in the intermediate cover portion 22. In this instance, the tire rim intermediate flange 15 is provided with a pair of spaced parallel generally axially extending elongated shallow riblike projections 30 which are preferably lined up with respect to the valve stem hole 20. Thereby, when the cover 10 is applied to the wheel in the customary manner by lining up and registering the valve stem aperture 29 with the valve stem 19, a turn-preventing finger 31 projecting as an extension from the flange portion 25 will engage between the spaced rib-like projections 30.

In order to avoid any danger of fracturing or cracking the material of the tire rim flange 15 in the pressing of the projections 30 therein, the projections are made very shallow. It has been found that where the projections are not in excess of 60 thousandths of an inch material of the gauge and quality customarily used on tire rims will be free from any danger of fracturing as an incident to pressing of the rib-like projections therein.

However, due to the very shallow protrusion of the projections 30 and the necessarily rounded formation thereof, cooperation of the turn-preventing means on the cover with the projections must necessarily be of a nature which will prevent overriding of the projections 30 as an incident to substantial torque forces tending to cause rotation of the cover on the wheel. Accordingly, the construction and relationship of the turn-preventing tongue or finger 31 is such that fairly close contact or at least approach of the finger to the portion of the intermediate flange 15 between the projections 31 is provided for so as to minimize any tendency to override the projections, and finger 31 is so constructed that it will resist deflection or camming during torque-induced engagement of the finger with either of the rib projections 30. Accordingly, the finger 31 includes a reinforcing juncture flange 32 angularly related to the body portion of the finger and joining the same to the cover flange portion 25. Thereby, the juncture flange 32 substantially stiffens the finger 31, especially at the proximal end portion thereof and in addition is backed up by the substantial resilience of the flange portion 25.

By having the finger 31 disposed opposite the valve stem hole 29 and located intermediate and substantially spaced from a pair of the retaining fingers 27, location of the valve stem aperture 29 is facilitated and indexed by placing of the finger 31 into position between the turn-preventing stop projection 30 through a canting maneuver of the cover toward and into position with respect to the valve stem portion of the tire rim. Radially outward projections of the finger 31 relative to the annular flange 25 is predetermined to be approximately equal to the spacing of the flange 25 from the intermediate flange 15 on the tire rim in full assembly of the cover 10 with the wheel. Should the finger 31 engage in a slightly oversized relation with the tire rim flange, flexibility in the free or distal end portion of the finger and resilient deflectability of the flange 25 enable slight tensioned deflectional yielding of the finger 31 to accommodate the slight difference. In any event, should there be a tendency for the cover to move rotationally on the wheel so that an edge of the finger 31 thrust against the adjacent side of one of the stop ribs 30, turning of the cover will be prevented.

For ease in assembly, the spacing between the stop ribs 30 is preferably somewhat greater than the substantial width of the turn-preventing fingers 31. However, this tolerance is within permissible limits of torsional shifting of the cover without distortion of the valve stem 19.

In the modification of Figures 5 and 6, a cover 40 is applied to the outer side of a vehicle wheel which in essential respect is identical with the wheel of Figure 2 and accordingly, the same reference numerals have been applied to designate similar parts of the wheel. The cover 40 comprises a body 41 having an intermediate dished annular portion 42 provided with a valve stem aperture 43 arranged to register with the valve stem aperture 20 in the side flange 14 of the tire rim. A marginal annular generally radially and axially outwardly directed portion 44 of the cover has an underturned flange 45 arranged to seat against the juncture shoulder between intermediate and terminal flanges of the tire rim and provided with a generally axially inwardly directed annular terminal flange portion 47 arranged to lie in radially inwardly spaced relation to the intermediate flange 15 in the assembled relationship of the cover to the wheel. Retaining fingers 48 extend as generally axially inward extensions from the flange portion 47, similarly as the fingers 27 of the cover 10 and cooperate in the same manner with the intermediate flange 15 of the tire rim to retain the cover on the wheel.

For retaining the cover 40 against turning on the wheel, the tire rim flange 15 is provided with a pair of shallow circumferentially spaced, and preferably circumferentially elongated rib-like stop projections 49 projecting radially inwardly from the inner face of the intermediate flange and not in excess of 60 thousandths projection, similarly as the stop projections 30 in order to avoid fracturing of the metal of the tire rim. Cooperable with the stop projections 49 is a turn-preventing finger 50 comprising an extension from the flange portion 47 and having its side edges turned generally radially outwardly obliquely toward and into engagement with the intermediate flange 15 between the stop projections 49. Thereby, the sides of the finger 50 serve as turn-preventing wings 51 opposing the adjacent inner ends of the stop projections 49, similarly as the sides of the finger 31 in Figures 2 and 4.

In Figures 7 and 8 is shown a cover 60 adapted to be applied to a vehicle wheel of substantially the same construction as the wheel of Figure 2 and thus having identical parts thereof identified by the same reference numerals. The cover 60 has a crown portion 61, and intermediate annular dished portions 62 and an outer marginal generally radially and axially outwardly oblique portion 63 provided with an underturned annular flange 64 adapted to engage the shoulder at juncture of the intermediate end terminal flanges of the tire rim. Extending from the inner portion of the flange 64 is a generally axially inwardly directed annular terminal flange portion 65 from which project axially inwardly extending finger extensions 67 of similar construction and operation as the retaining fingers 27 of the cover 10.

For retaining the cover 60 against turning on the wheel, the intermediate flange 15 of the tire rim is provided with a pair of preferably longitudinally elongated radially inwardly directed stop rib projections or bumps 68 similar to the ribs 30 of the wheel as shown in Figures 2 and 4, but spaced substantially further apart at opposite sides and preferably equidistant from the valve stem opening 20 in the side flange 14 of the tire rim. Turn-preventing means on the cover in this form of the invention comprise a pair of oppositely directed preferably substantially triangular obliquely angled spur-like wing flanges or fingers 69 which are struck out from the flange portion 65 preferably adjacent to and in part also from a pair of the retaining fingers 67. The turn preventing wing flanges 69 provide edges which are directed generally toward the opposing sides of the stop ribs 68 in the fully assembled relation of the cover with the wheel. Since the edges of the wing flanges 69 terminate in points that are directed generally in opposite circumferential directions, it will be appreciated that the points will tend to dig into the stop ribs 68 and thus quite efficiently prevent any rotation of the cover on the wheel in the face of even violent torque forces.

A valve stem aperture 70 is provided in the intermediate portion 62 of the cover 60 in centered intermediate relation to the turn-preventing spur wings 69 for registration in assembly with the valve stem aperture 20 of the tire rim.

It will be understood that modifications and variations may be effected without departing from the scope of the novel concepts of the present invention.

I claim as my invention:

1. In a wheel structure including a tire rim having a radially inwardly facing flange provided with a pair of circumferentially spaced radially inwardly directed shallow stop projections, a cover for disposition at the outer side of the wheel having means thereon for cover retaining engagement with the wheel and provided in addition to such means and spaced therefrom with turn-preventing means including circumferentially oppositely directed edges cooperatively related to the opposed surfaces of said projections for restraining the cover against turning on the wheel, said edges being provided on an axially extending radially outwardly facing tongue on the cover.

2. In a wheel structure including a tire rim having a radially inwardly facing flange provided with a pair of circumferentially spaced radially inwardly directed shallow stop projections, a cover for disposition at the outer side of the wheel having means thereon for cover retaining engagement with the wheel and provided in addition to such means and spaced therefrom with turn-preventing means including circumferentially oppositely directed edges cooperatively related to the opposed surfaces of said projections for restraining the cover against turning on the wheel, said turn-preventing means comprising a generally axially elongated finger having side edges affording said cooperating edges.

3. In a wheel structure including a tire rim having a radially inwardly facing flange provided with a pair of circumferentially spaced radially inwardly directed shallow stop projections, a cover for disposition at the outer side of the wheel having means thereon for cover retaining engagement with the wheel and provided in addition to such means and spaced therefrom with turn-preventing means including circumferentially oppositely directed edges cooperatively related to the opposed surfaces of said projections for restraining the cover against turning on the wheel, said edges being on a pair of spur-like wing flange members on the cover.

4. In a wheel structure including a tire rim having a radially inwardly facing flange provided with a pair of circumferentially spaced generally radially inwardly directed shallow stop projections affording circumferentially oppositely facing stop shoulders, a cover for disposition at the outer side of the wheel having means thereon for cover retaining engagement with the wheel and provided in addition to such means and spaced therefrom with generally radially outwardly bent flange structure having respective circumferentially oppositely facing turn-preventing shoulders for disposition adjacent to and in generally complementary relation to the shoulders of the stop projections for thereby holding the cover against turning on the wheel due to torque forces in service.

5. In a wheel structure including a tire rim including a flange having a radially inwardly facing surface and adapted for cooperation pneumatically with a tubeless tire, a second flange on the tire rim disposed axially inwardly from said first mentioned flange and having a valve stem aperture therethrough, a pair of radially inwardly projecting stop bumps on said radially inwardly facing surface of the first mentioned flange, said bumps being spaced apart on a portion of the first mentioned flange contiguous the apertured portion of the second flange and having the space between the bumps substantially aligned with said valve stem aperture, and a cover for disposition at the outer side of the wheel having a valve stem aperture registerable with said valve stem aperture in the tire rim through a canting maneuver of the cover toward and into position with respect to the valve stem portion of the tire rim, and including a marginal cover retaining structure retainingly engageable with the tire rim and turn-preventing means affording radially outwardly projecting and circumferentially oppositely facing shoulders disposed radially outwardly adjacent to the valve stem aperture in the cover and movable generally radially outwardly toward the first rim flange as an incident to said canting maneuver of the cover into position and thereby avoiding catching on or resistance from the rim during the assembly movement for disposition in adjacent respectively opposing cooperative relation to said stop bumps to restrain the cover against turning in either opposite rotary direction on the wheel in service.

6. A wheel structure as defined in claim 5, wherein the turn-preventing shoulder means comprises flange structure bent radially outwardly and providing oppositely directed edges serving as said oppositely facing cover shoulders.

7. In a cover for disposition at the outer side of a vehicle wheel, a circular cover body having therebehind retaining fingers extending generally axially inwardly and provided with cover retaining terminals engageable with a wheel flange, said fingers having adjacent spaced side portions, said side portions having pressed generally radially therefrom turn-preventing projections provided with respective circumferentially oppositely facing turn-preventing shoulders opposable to and engageable with complementary turn-preventing shoulder means on the wheel flange.

8. In a cover for disposition at the outer side of a vehicle wheel, a circular cover body having therebehind retaining fingers extending generally axially inwardly and provided with cover retaining terminals engageable with a wheel flange, said fingers having adjacent spaced side portions, said side portions having pressed generally radially therefrom turn-preventing projections provided with respective circumferentially oppositely facing turn-preventing shoulders opposable to and engageable with complementary turn-preventing shoulder means on the wheel flange, said turn-preventing projections comprising respective spur-like flanges struck from said finger side portions.

9. In a wheel structure including a tire rim having a radially inwardly facing flange provided with a pair of circumferentially spaced radially inwardly directed shallow stop projections, a cover for disposition at the outer side of the wheel having means thereon for cover retaining engagement with the wheel and provided in addition to such means and spaced therefrom with turn-preventing means including circumferentially oppositely directed edges cooperatively related to the opposed surfaces of said projections for restraining the cover against turning on the wheel, said turn-preventing means comprising a generally axially elongated finger having side edges affording said cooperating edges, said finger side edges being angled generally radially outwardly as well as circumferentially to project toward said rim flange.

10. In a wheel structure including a tire rim having a generally radially inwardly facing axially extending flange, a cover for disposition over the outer side of the wheel including a radially outer marginal portion having therebehind a plurality of generally axially inwardly extending cover retaining resiliently flexible fingers having terminal portions for retaining engagement in press-on, pry-off relation with said rim flange, a pair of said fingers being in adjacent spaced relation, each of said adjacent fingers having struck therefrom and angled toward said rim flange a generally triangularly shaped turn-preventing spur spaced axially outwardly relative to the finger terminal and with a sharp tip of the spur engageable with a portion of said rim flange.

References Cited in the file of this patent

UNITED STATES PATENTS

| | | |
|---|---|---|
| Re. 22,042 | Lyon | Mar. 3, 1942 |
| 2,076,789 | Le Jeune | Apr. 13, 1937 |
| 2,624,636 | Lyon | Jan. 6, 1953 |
| 2,732,262 | Buerger | Jan. 24, 1956 |
| 2,804,346 | Landell | Aug. 27, 1957 |

FOREIGN PATENTS

| | | |
|---|---|---|
| 491,457 | Canada | Mar. 24, 1953 |